US012292703B2

(12) United States Patent
Okuyama

(10) Patent No.: US 12,292,703 B2
(45) Date of Patent: May 6, 2025

(54) DEVELOPING DEVICE HAVING INDUCTANCE SENSOR

(71) Applicant: CANON KABUSHIKI KAISHA, Tokyo (JP)

(72) Inventor: Yuta Okuyama, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/138,867

(22) Filed: Apr. 25, 2023

(65) Prior Publication Data

US 2023/0400791 A1 Dec. 14, 2023

(30) Foreign Application Priority Data

Jun. 9, 2022 (JP) ................................ 2022-093539

(51) Int. Cl.
*G03G 15/08* (2006.01)

(52) U.S. Cl.
CPC ..... *G03G 15/0848* (2013.01); *G03G 15/0853* (2013.01); *G03G 15/0891* (2013.01);
(Continued)

(58) Field of Classification Search
CPC ........... G03G 15/0891; G03G 15/0851; G03G 15/80; G03G 2215/0617; G03G 15/0893;
(Continued)

(56) References Cited

U.S. PATENT DOCUMENTS 10,845,729 B2 11/2020 Wakisaka et al.
2020/0033759 A1* 1/2020 Sako ................. G03G 15/0853

FOREIGN PATENT DOCUMENTS

JP H07-248676 A 9/1995
JP H11143209 A * 5/1999
(Continued)

OTHER PUBLICATIONS

Masashi Wakisaka, U.S. Appl. No. 18/139,466, filed Apr. 26, 2023.

*Primary Examiner* — Stephanie E Bloss
*Assistant Examiner* — Laura Roth
(74) *Attorney, Agent, or Firm* — VENABLE LLP

(57) ABSTRACT

A developing device includes a developer bearing member and carrier to develop an electrostatic latent image formed on an image bearing member, a developing container, a conveying screw which conveys the developer, and an inductance sensor which includes a detecting portion which detects magnetic permeability of the developer in the developing container. If the inductance sensor is not attached to the developing container and a predetermined magnetic material is disposed in contact with the detection portion, an output value when the detecting portion detects magnetic permeability of the predetermined magnetic material is A, and if the inductance sensor is not attached to the developing container and the predetermined magnetic material is disposed 1 mm away from the detection portion in a vertical direction passing through the detection portion, an output value when the detecting portion detects magnetic permeability of the predetermined magnetic material is B, with B/A≥0.1 being satisfied.

7 Claims, 15 Drawing Sheets

(52) U.S. Cl.
CPC ............... *G03G 2215/0833* (2013.01); *G03G 2215/0888* (2013.01)

(58) Field of Classification Search
CPC ........... G03G 15/0848; G03G 15/0853; G03G 2215/0607; G03G 15/086; G03G 2215/00046; G03G 2215/0888; G03G 2215/083; G03G 2215/0833
See application file for complete search history.

(56) References Cited

FOREIGN PATENT DOCUMENTS

| | | | | |
|---|---|---|---|---|
| JP | 2008209592 | A | * | 9/2008 |
| JP | 2009-186799 | B2 | | 8/2009 |
| JP | 2016-012078 | A | | 1/2016 |

* cited by examiner

DEVELOPING DEVICE HAVING INDUCTANCE SENSOR

BACKGROUND OF THE INVENTION

Field of the Invention

This invention relates to a developing device with a conveying screw that conveys the developer.

Description of the Related Art

In an image forming apparatus using an electrophotographic system or the like, an electrostatic latent image formed on a photosensitive drum is developed as a toner image by a developing device. Such a developing device with two-component developer containing nonmagnetic toner and magnetic carrier has been used for a long time. In such a developing device with two-component developer, the developer contained in the developing container is conveyed while being stirred by a screw.

In this developing system using two-component developer, the weight ratio of toner in the developer (hereinafter referred to as toner density) must be stably kept within a narrow range in order to obtain reproducibility of an image density of the output image. To maintain the toner density of the two-component developer circulating in the developing container within a predetermined range, a technique is used in which a sensor is installed on the wall of the developing container to detect the toner density and the supply of replenishing toner is adjusted according to the detection result.

As a sensor for detecting the toner density of the developer in the developing container, an inductance sensor whose inductance changes according to the ratio of magnetic material in the developer is known. The inductance sensor changes its output according to the amount of magnetic material present in the detection area to detect the toner density of the developer.

Some inductance sensors include a detecting portion that protrudes from the circuit board. The detection portion includes an iron core and a coil wound around the iron core. Other inductance sensors are configured to have a coil whose pattern is directly printed on the circuit board (Japanese Patent Application Laid-open No. 2016-012078).

An inductance sensor with a coil whose pattern is printed on a circuit board does not have an iron core. Therefore, it can be produced inexpensively as compared with an inductance sensor with an iron core.

Since an inductance sensor with a coil whose pattern is printed does not have an iron core, the concentration of the magnetic field is hard to happen, which leads to a wider detection range of the sensor than that of an inductance sensor with an iron core. These inductance sensors change their output according to the amount of magnetic material present in the detection area to detect the toner density. Therefore, the density of the developer in the detection area of the inductance sensor must be constant.

However, the density of developer in the detection area of an inductance sensor with a coil whose pattern is printed may fluctuate, and the entire detection area may not be filled with the developer. In this case, even if the toner density in the developer in the developing container is constant, the output of the sensor changes due to the fluctuation in the developer density in the detection area of the sensor. As a result, appropriate toner replenishment may not be performed.

Factors that cause the developer density to fluctuate include a fluctuation in the amount of developer in the developing container and a change in the image forming speed of the image forming apparatus. As an example, FIG. 15 shows the results of converting the output results of the inductance sensor to the equivalent of toner density when the developer amount changes. FIG. 15 indicates the relationship between the developer amounts and toner densities in the case where an inductance sensor that has an iron core is used and the case where an inductance sensor with a coil whose pattern is printed is used. It can be seen from FIG. 15 that the change in the detection result of toner density for the fluctuation of developer amount in the case of the inductance sensor with a coil whose pattern is printed is greater than that in the case of the inductance sensor with an iron core. Namely, as the amount of developer in the developing container decreases, the density of the developer in the detection area of the inductance sensor fluctuates accordingly, which has reduced the accuracy of detection of the toner density in the developer.

SUMMARY OF THE INVENTION

The object of this invention is to stabilize the detection result of the magnetic permeability of the developer by the inductance sensor even when the density of the developer accommodated in the developing container fluctuates.

One configuration of the present invention is a developing device comprising:

a developer bearing member which bears developer including toner and carrier to develop an electrostatic latent image formed on an image bearing member;

a developing container which accommodates the developer;

a conveying screw which conveys the developer accommodated in the developing container; and an inductance sensor which includes a detecting portion which detects magnetic permeability of the developer accommodated in the developing container, wherein the inductance sensor has such detection sensitivity that the detection sensitivity with which the detection portion detects magnetic permeability in a state where a magnetic material is disposed at a position 1 mm away from the detection portion in a vertical direction is equal to or greater than 10% of detection sensitivity with which the detection portion detects magnet permeability in a state where the magnetic material is disposed at a position which is in contact with the detection portion, wherein the conveying screw includes:

a first conveying portion which has a first rotary shaft portion and a first blade portion which is spirally formed on an outer circumferential surface of the first rotary shaft portion and which conveys the developer in a conveying direction of the conveying screw; and a second conveying portion which has a second rotary shaft portion and a second blade portion which is spirally formed on an outer circumferential surface of the second rotary shaft portion and which conveys the developer in the conveying direction of the conveying screw, wherein the first conveying portion is disposed opposite the detection portion with respect to the conveying direction of the conveying screw, wherein the second conveying portion is disposed downstream of a downstream end of the detection portion in the conveying direction of the conveying screw within one pitch of the first blade portion from the downstream end, and wherein a shaft diameter of the second rotary shaft portion is greater than that of the first rotary shaft portion.

Another configuration of the present invention is a developing device comprising:

a developer bearing member which bears developer including toner and carrier to develop an electrostatic latent image formed on an image bearing member;

a developing container which accommodates the developer;

a conveying screw which conveys the developer accommodated in the developing container; and an inductance sensor which includes a detecting portion which detects magnetic permeability of the developer accommodated in the developing container, wherein the inductance sensor has such detection sensitivity that the detection sensitivity with which the detection portion detects magnetic permeability in a state where a magnetic material is disposed at a position 1 mm away from the detection portion in a vertical direction is equal to or greater than 10% of detection sensitivity with which the detection portion detects magnet permeability in a state where the magnetic material is disposed at a position which is in contact with the detection portion, wherein the conveying screw includes:

a first conveying portion which has a first rotary shaft portion and a first blade portion which is spirally formed on an outer circumferential surface of the first rotary shaft portion and which conveys the developer in a conveying direction of the conveying screw; and a second conveying portion which has a second rotary shaft portion and a second blade portion which is spirally formed on an outer circumferential surface of the second rotary shaft portion and which conveys the developer in the conveying direction of the conveying screw, wherein the first conveying portion is disposed opposite the detection portion with respect to the conveying direction of the conveying screw, wherein the second conveying portion is disposed downstream of a downstream end of the detection portion in the conveying direction of the conveying screw within one pitch of the first blade portion from the downstream end, and wherein a pitch of the second blade portion is less than that of the first blade portion.

Another configuration of the present invention is a developing device comprising:

a developer bearing member which bears developer including toner and carrier to develop an electrostatic latent image formed on an image bearing member;

a developing container which accommodates the developer;

a conveying screw which conveys the developer accommodated in the developing container; and an inductance sensor which includes a detecting portion which detects magnetic permeability of the developer accommodated in the developing container, wherein the inductance sensor has such detection sensitivity that the detection sensitivity with which the detection portion detects magnetic permeability in a state where a magnetic material is disposed at a position 1 mm away from the detection portion in a vertical direction is equal to or greater than 10% of detection sensitivity with which the detection portion detects magnet permeability in a state where the magnetic material is disposed at a position which is in contact with the detection portion, wherein the conveying screw includes:

a first conveying portion which has a first rotary shaft portion and a first blade portion which is spirally formed on an outer circumferential surface of the first rotary shaft portion and which conveys the developer in a conveying direction of the conveying screw; and a second conveying portion which has a second rotary shaft portion, a second blade portion which is spirally formed on an outer circumferential surface of the second rotary shaft portion and which conveys the developer in the conveying direction of the conveying screw, and a third blade portion which is spirally formed on the outer circumferential surface of the second rotary shaft portion and which conveys the developer in a direction opposite the conveying direction of the conveying screw, wherein the first conveying portion is disposed opposite the detection portion with respect to the conveying direction of the conveying screw, wherein the second conveying portion is disposed downstream of a downstream end of the detection portion in the conveying direction of the conveying screw within one pitch of the first blade portion from the downstream end, and wherein an outer diameter of the third blade portion is less than an outer diameter of the second blade portion and is equal to or greater than a half of the outer diameter of the second blade portion.

Further features of the present invention will become apparent from the following description of exemplary embodiments with reference to the attached drawings.

DESCRIPTION OF THE EMBODIMENTS

Hereinafter, with reference to the drawings, preferable embodiments of the present invention will be described in detail. The dimensions, materials, shapes, and relative arrangement of the components described in the following embodiments should be changed as appropriate depending on the configuration and various conditions of the apparatus to which the invention is applied, and it is not intended to limit the scope of the invention to them alone.

First Embodiment

The image forming apparatus equipped with a developing device according to the first embodiment will be described below using FIGS. 1 to 12.

(Image Forming Apparatus)

Figure 1:
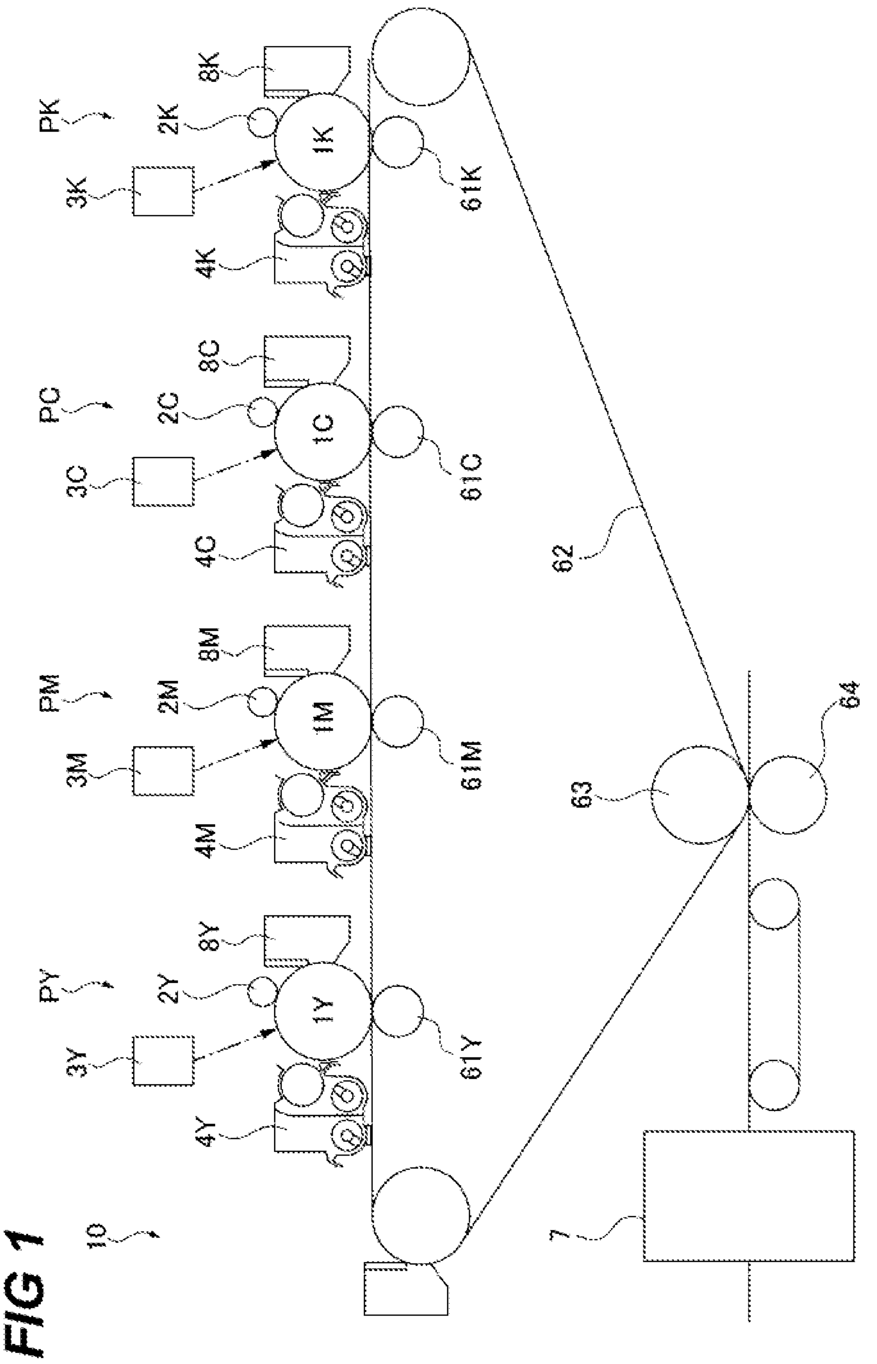
FIG. 1 is a schematic diagram of an image forming apparatus.

First, the schematic configuration of the image forming apparatus will be described using FIG. 1. The image forming apparatus 10 uses an electrophotographic system and includes four image forming portions PY, PM, PC and PK, which are respectively provided for four colors, yellow Y, magenta M, cyan C and black K. In this embodiment, a so-called tandem system is adopted, in which the image forming portions PY, PM, PC and PK are arranged along the direction of rotation of the intermediate transfer belt 62, which will be described below. The image forming apparatus 10 forms a toner image on a recording medium such as a recording sheet of paper in response to an image signal from an image reading device (not shown) connected to the main body of the image forming apparatus or a host device such as a personal computer communicably connected to the main body of the image forming apparatus. As a recording medium, a sheet material of paper, a plastic film, cloth, and the like can be used.

To begin with, such an imaging process will be briefly described. First, toner images of the respective colors are formed on the photosensitive drums 1Y, 1M, 1C and 1K in the image forming portions PY, PM, PC, and PK, respectively. The toner images of the respective colors formed in this way are transferred onto the intermediate transfer belt 62 and then transferred from the intermediate transfer belt 62 to the recording medium. The recording medium on which the toner images have been transferred is conveyed to the fixing device 7, where the toner images are fixed to the recording medium. Next, a more detailed description will be made.

The four image forming portions PY, PM, PC and PK provided in the image forming apparatus 10 have substantially the same configuration, except that the developing colors are different from each other. For this reason, the image forming portion PY will be described below as a representative, and the configurations of the other image forming portions are shown by replacing the letter "Y" in the reference characters attached to the configuration in image forming portion PY with the letter "M", "C" and "K", respectively, and the descriptions thereof are omitted.

The image forming portion PY is equipped with the photosensitive drum 1Y which is a cylindrical photosensitive body as an image bearing member. The charging roller 2Y (charging device), the developing device 4Y, the primary transfer roller 61Y, and the cleaning device 8Y are arranged around the photosensitive drum 1Y. The exposure device (laser scanner) 3Y is located above the photosensitive drum 1Y in the figure.

The intermediate transfer belt 62 is provided opposite the photosensitive drums 1Y, 1M, 1C and 1K. The intermediate transfer belt 62 is stretched by a plurality of rollers and is driven to rotate by some of the drive rollers among the plurality of rollers. The secondary transfer outer roller 64 as a secondary transfer member is provided at a position opposite to the secondary transfer inner roller 63 via the intermediate transfer belt 62 and constitutes the secondary transfer portion T2 for transferring the toner image on the intermediate transfer belt 62 to the recording medium. The fixing device 7 is located downstream of the secondary transfer portion T2 in the recording medium conveying direction.

Next, the process of forming an image with the image forming apparatus 10 as configured above will be described. When the image forming operation starts, the surface of the rotating photosensitive drum 1Y is uniformly charged by the charging roller 2Y. The photosensitive drum 1Y is then exposed by a laser beam corresponding to an image signal emitted from the exposure device 3Y. As a result, an electrostatic latent image according to the image signal is formed on the photosensitive drum 1Y. The electrostatic latent image on the photosensitive drum 1Y is developed into a visible image by the toner accommodated in the developing device 4Y.

The toner image formed on the photosensitive drum 1Y is primarily transferred to the intermediate transfer belt 62 at the primary transfer portion T1Y which is configured by the photosensitive drum 1Y and the primary transfer roller 61Y which is opposed to the photosensitive drum 1Y via the intermediate transfer belt 62. The toner remaining on the surface of the photosensitive drum 1Y after the primary transfer (remaining toner after transfer) is removed by the cleaning device 8Y.

These operations are performed sequentially in the image forming portions corresponding to magenta, cyan and black, respectively and the toner images of the four colors are superimposed on the intermediate transfer belt 62. The recording medium accommodated in a recording medium storage cassette (not shown) is then conveyed to the secondary transfer portion T2 in accordance with the timing of toner image formation, and the four-color toner images on the intermediate transfer belt 62 are secondarily transferred to the recording medium at once. The toner remaining on the intermediate transfer belt 62 after the secondary transfer is cleaned by an intermediate transfer belt cleaner (not shown).

Next, the recording medium is then conveyed to the fixing device 7, where the recording medium is heated and pressurized so that the toner on the recording medium melts and is mixed. As a result, the toner is fixed on the recording medium as a full-color image. The recording medium is then discharged from the apparatus, which completes the series of image forming processes. In addition, it is also possible to form a single or multiple color image(s) of the desired color(s) using only the image forming portion(s) corresponding to the desired color(s).

(Developing Device)

Figure 2:
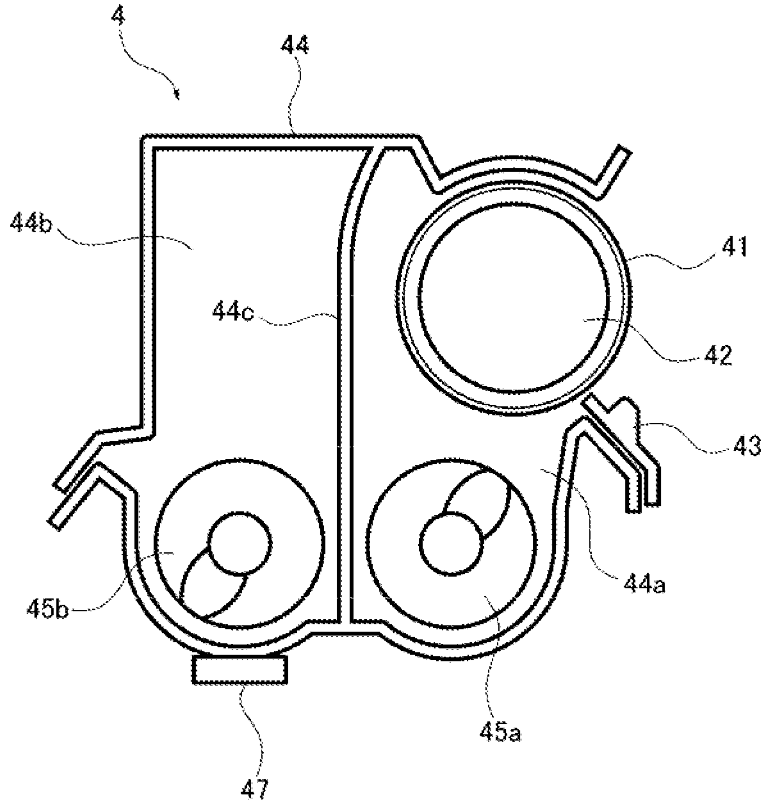
FIG. 2 is a diagram showing a cross-sectional view of a developing device.
Figure 3:
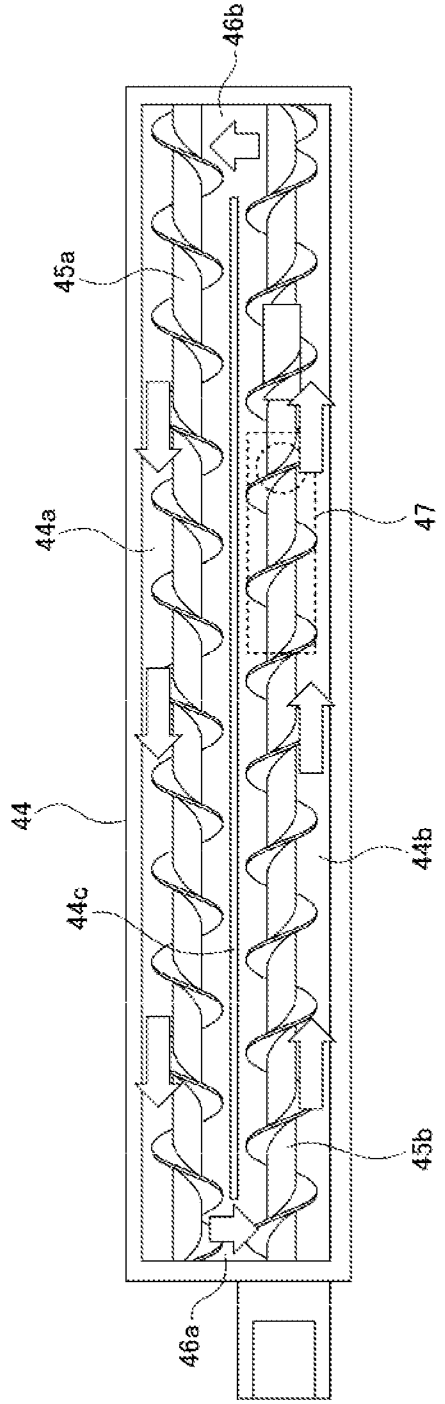
FIG. 3 is a diagram showing a circulation path of the developer.

Next, the developing device 4Y will be described using FIGS. 2 and 3. FIG. 2 is a diagram showing a cross-sectional view of the developing device 4Y. FIG. 3 is a diagram showing a circulation path of the developer. The configurations of the developing devices 4M, 4C and 4K are the same as that of the developing device 4Y. The developing device 4Y includes the developing container 44 for accommodating two-component developer having non-magnetic toner and magnetic carrier. The developing container 44 has an opening in the developing area facing the photosensitive drum 1Y. The developing sleeve 41 is arranged so as to be partially exposed in this opening and to be rotatable. The magnet roll 42 is disposed inside the developing sleeve 41 so as not to be rotatable.

In this embodiment, the developing sleeve 41 is made of non-magnetic material and rotates at a predetermined process speed (circumferential speed) during the developing operation. The magnet roll 42 as a magnetic field generating means includes a plurality of magnetic poles along the circumferential direction. With the generated magnetic field, the developer is borne on the surface of developing sleeve 41.

The layer thickness of the developer borne on the surface of the developing sleeve 41 is restricted by the developing blade 43 as a restricting member, and a thin layer of developer is formed on the surface of the developing sleeve 41. The developing sleeve 41 conveys the developer formed in a thin layer to the developing area while bearing the developer. In the developing area, the developer on the developing sleeve 41 becomes in a napped state to form a magnetic brush. In this embodiment, the magnetic brush comes in contact with the photosensitive drum 1Y and thereby supplying the toner of the developer to the photosensitive drum 1Y. As a result, an electrostatic latent image on the photosensitive drum 1Y is developed to a toner image. The developer after the development of the latent image is collected in the developing chamber 44*a* in the developing container 44 as the developing sleeve 41 rotates.

The interior of the developing container 44 is divided into the developing chamber 44*a* as a first chamber and the stirring chamber 44*b* as a second chamber by the vertically extending partition wall 44*c*. The communicating openings 46*a* and 46*b* are formed on both ends in the longitudinal direction (in the direction of the rotation axis of the developing sleeve 41) of the partition wall 44*c*, which communicates with the developing chamber 44*a* and the stirring chamber 44*b*, respectively. The communicating opening 46*a* is a first communicating portion that allows the developer to move from the developing chamber 44*a* to the stirring chamber 44*b*. The communicating opening 46*b* is a second communicating portion that allows the developer to move from the stirring chamber 44*b* to the developing chamber 44*a*. With these openings, a circulation path for the developer between the developing chamber 44*a* and the stirring chamber 44*b* is formed. The arrows shown in FIG. 3 indicate the direction of circulation of the developer.

In the developing container 44, the first conveying screw 45*a* as a first conveying member and the second conveying screw 45*b* as a second conveying member are arranged, which stir and convey the developer, respectively. The first conveying screw 45*a* is located in the developing chamber 44*a* and conveys the developer in the developing chamber 44*a* in the first direction from the communicating opening 46*b* to the communicating opening 46*a* while stirring the developer, and supplies the developer to the developing sleeve 41. The second conveying screw 45*b* is located in the stirring chamber 44*b* and conveys the developer in the stirring chamber 44*b* in the second direction from the communicating opening 46*a* to the communicating opening 46*b* while stirring the developer.

A developer replenishing device (not shown) accommodating a replenishment developer consisting of toner only or toner and magnetic carrier is located in the image forming apparatus. A supplying screw is installed in the developer replenishing device to enable the replenishment of developer equivalent to the amount of the developer having been used for the image formation to be supplied from the developer replenishing device to the stirring chamber in the developing container 44. The amount of replenishment developer is adjusted by the control means (CPU 51 shown in FIG. 6) which controls the number of rotations of the supplying screw driven by a driving motor (toner replenishing motor 54 shown in FIG. 6).

The developing device 4Y includes a density detection means (toner density detection portion) capable of detecting toner density (ratio of the weight of toner particles to the total weight of carrier particles and toner particles, T/D ratio) in the developing container 44. In this embodiment, the inductance sensor 47 is used as the toner density detection portion. The inductance sensor 47 is installed in the stirring chamber 44*b* and detects the magnetic permeability in a predetermined detection area from the sensor surface 47*f* (see FIG. 8A). When the toner density of the developer changes, the magnetic permeability depending on the mixing ratio of magnetic carrier and non-magnetic toner also changes. Therefore, the toner density can be detected by detecting the change in magnetic permeability with the inductance sensor 47.

(Circulation of Developer)

Next, the circulation of the developer in the developing container 44 will be described. The first conveying screw 45*a* and the second conveying screw 45*b* are arranged in parallel along the direction of the axis of rotation of the developing sleeve 41. The first conveying screw 45*a* and the second conveying screw 45*b* convey the developer in opposite directions to each other along the direction of the axis of rotation of the developing sleeve 41. Thus, the developer is circulated in the developing container 44 by the first conveying screw 45*a* and the second conveying screw 45*b* through the communication openings 46*a* and 46*b*.

Namely, by the conveying force of the first conveying screw 45*a* and the second conveying screw 45*b*, the developer in the developing chamber 44*a*, where toner has been consumed in the developing process and the toner density has decreased is conveyed to the stirring chamber 44*b* via the communication opening 46*a* and is moved inside the stirring chamber 44*b*.

A replenishing opening (not shown) for replenishing developer from the developer replenishing device is provided upstream of the communicating opening 46*a* of the stirring chamber 44*b* in the developer conveying direction of the second conveying screw 45*b*. As a result, in the stirring chamber 44*b*, the developer conveyed from the developing chamber 44*a* via the communicating opening 46*a* and the replenishment developer replenished from the developer replenishing device via the replenishing opening are conveyed while being stirred by the second conveying screw 45*b*. The developer conveyed by the second conveying screw 45*b* then moves to the developing chamber 44*a* through the communicating opening 46*b*.

In this embodiment, the developer accommodated in the developing container 44 is two-component developer in which negatively charged non-magnetic toner and magnetic carrier are mixed. The non-magnetic toner is made by encapsulating a colorant, a wax component, etc. in resin such as polyester, styrene, etc., and then pulverizing or polymerizing it into a powder. The magnetic carrier is constituted of a core including resin particles mixed with ferrite particles and magnetic powder and a resin coating on the surface of the core.

(Inductance Sensor)

Figure 4:
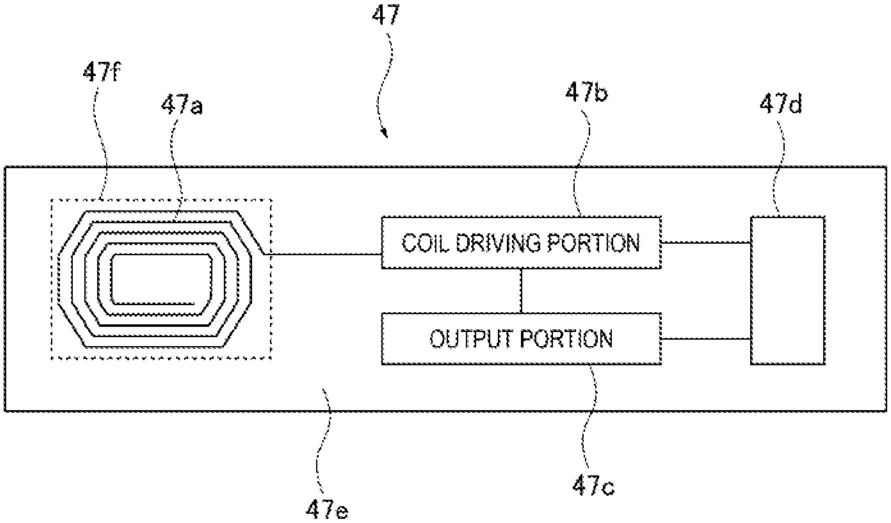
FIG. 4 is a diagram showing the configuration of an inductance sensor.
Figure 5:
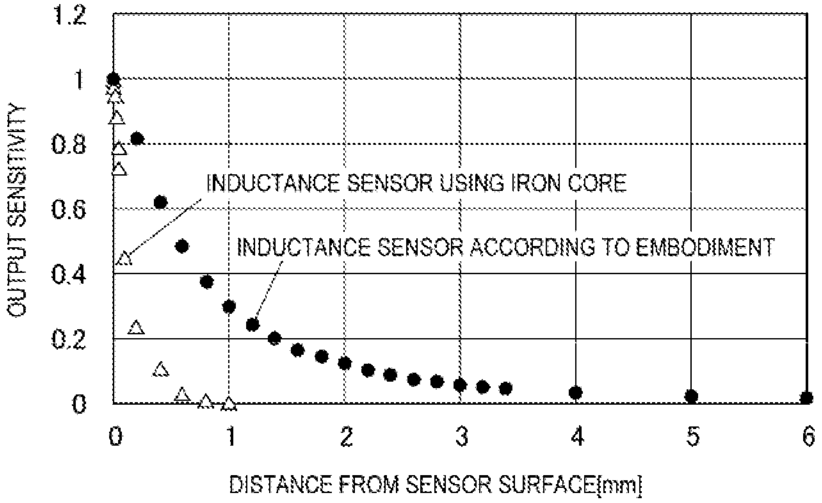
FIG. 5 is a graph showing the sensitivity of the inductance sensor to distance.

Next, the inductance sensor 47 used in this embodiment will be described using FIGS. 4 and 5. FIG. 4 is a diagram showing the configuration of the inductance sensor. FIG. 5 is a graph showing the sensitivity of the inductance sensor to distance.

In this embodiment, the inductance sensor 47 is located at the bottom surface of the stirring chamber 44*b* and is opposed to the second conveying screw 45*b* to detect the toner density of the developer accommodated in the developing container 44 (see FIG. 2). The inductance sensor 47 is a magnetic permeability sensor that can output the output pulses as a detection signal according to the magnetic permeability of the developer by utilizing the inductance of the coil.

The inductance sensor 47 includes the coil 47*a*, the pattern of which is printed on a circuit board, as shown in FIG. 4. In addition, inductance sensor 47 includes the coil driving portion 47*b* that electrically drives the coil 47*a*, the output portion 47*c* that generates an output pulse signal, and the connector 47*d*.

The inductance sensor 47 includes the sensor surface 47*f* as a detection portion that detects the magnetic permeability of the developer. The sensor surface 47*f* of the inductance sensor 47 is defined as the area where the pattern of the coil 47*a* is printed on the circuit board 47*e* (area indicated by the dashed line in FIG. 4). The inductance sensor 47 does not have an iron core in the center of the coil 47*a*.

The coil 47*a* is a wiring pattern formed on the circuit board that does not overlap in the direction from the circuit board 47*e* to the second conveying screw 45*b*. The coil 47*a* has an inductance component. The coil driving portion 47*b* includes a circuit with a capacitor. The coil 47*a* and the capacitor of the coil driving portion 47*b* constitutes an LC resonance circuit that is resonated by the capacitance of the capacitor and the inductance of the coil 47*a*. The output portion 47*c* is a pulse generating circuit with a comparator that converts the analog signal oscillated by the coil driving portion 47*b* into a digital signal. The output portion 47*c* outputs a binarized pulse signal.

In this embodiment, the coil 47*a* is configured by a pattern printed on a circuit board. However, the coil 47*a* is not limited to this configuration. The coil 47*a* may be configured with a wiring wound on the circuit board around the vertical direction, as long as it does not have an iron core.

The resonance period of the resonance circuit configured by the coil 47*a* and the coil driving portion 47*b* varies depending on the density of magnetic material in the detection area of the sensor surface 47*f* More specifically, when the toner density of the developer in the detection area of the coil 47*a* becomes lower, the proportion of magnetic carrier in the developer in unit volume increases, and the apparent magnetic permeability of the developer increases, resulting in a longer resonance period. Conversely, when the toner density of the developer is higher, the proportion of magnetic carrier in the developer in unit volume becomes small, and the apparent magnetic permeability of the developer becomes lower, resulting in a shorter resonance period.

Utilizing this property, the toner density of the developer in the detection area of the coil 47*a* can be detected by measuring the time required to count a predetermined number of pulses of the pulse signal output from the output portion 47*c*.

A specific example is as follows. When the resonance frequency of the developer with the toner density of 10 [%] present in the detection area of the coil 47*a* is 1000 [kHz], the number of pulses to count is set to 5000 and the clock used to measure the time required for counting is set to 200 [MHz]. In this case, the time required to count 5000 pulses is 5000 [ρsec], which is measured as 100000 [cnt] with a clock of 20 [MHz].

On the other hand, when the toner density is 8 [%], the resonance period of the resonance circuit configured by the coil 47*a* and the coil driving portion 47*b* becomes longer than when the toner concentration is 10 [%], and the resonance frequency is 990 [kHz]. In this case, the time required to count 5000 pulses is about 5050 [usec], which is measured as 101000 [cnt] with a clock of 20 [MHz].

In this way, the toner density of the developer can be detected with the inductance sensor 47 as the value of the number of pulses.

The detection area of the sensor surface 47*f* of the inductance sensor 47 is defined as the area where the pattern of the coil 47*a* is printed on the circuit board 47*e* as shown in FIG. 4, and also as the area of the output sensitivities shown in FIG. 5 in the vertical direction from the sensor surface 47*f*. As shown in FIG. 5, the sensor surface 47*f* of the inductance sensor 47 has a detection sensitivity at a position 1 [mm] away from the sensor surface 47*f* in the direction toward the second conveying screw 45*b*, which detection sensitivity is equal to or higher than the 10% of the detection sensitivity at the position in contact with the sensor surface 47*f*.

FIG. 5 shows the static distance characteristics of the inductance sensor. This graph shows the detection sensitivity of the inductance sensor measured when the distance of a magnetic plate (not shown) is varied in the vertical direction from the sensor surface of the inductance sensor. The magnetic plate is made of ferrite (relative magnetic permeability is about 200) with a diameter of 13 [mm] and thickness of 1.5 [mm]. In FIG. 5, measured are the static characteristics of an inductance sensor with an iron core in the center of the coil as a comparative example, in addition to the inductance sensor 47 according to this embodiment.

In FIG. 5, the horizontal axis indicates the distance [mm] of the inductance sensor from the sensor surface and the vertical axis indicates the output sensitivity (detection sensitivity) of the inductance sensor. The sensitivity shown on the vertical axis in FIG. 5 indicates the ratio of the output (change in detection sensitivity) at each position where the magnetic plate is separated from the sensor surface when the output at the position where the magnetic plate is in contact with the sensor surface of the inductance sensor is 1. The aforementioned measurement of the detection sensitivity is made using a magnetic plate with the inductance sensor removed from the developing container and with no developer on the sensor surface of the inductance sensor.

The measurement result in FIG. 5 shows that the detection sensitivity of the inductance sensor 47 according to this embodiment has some sensitivity up to a position (distance) where the magnetic plate is about 4 to 5 [mm] away from the sensor surface 47*f*, although the sensitivity decreases as the magnetic plate moves away from the sensor surface 47*f* in the vertical direction. On the other hand, the detection sensitivity of the inductance sensor of the comparative example has an iron core in the center of the coil, so the magnetic field used to detect the magnetic plate is concentrated on the peripheral portion of the sensor surface as compared to that of this embodiment. As a result, the detection sensitivity of the inductance sensor in the comparative example is almost zero at a distance of 1 [mm] from the sensor surface.

In other words, the inductance sensor in this embodiment has a wider detection range from the sensor surface to the vertical direction than that in the comparative example. More specifically, at a position 1 [mm] away from the sensor surface in the vertical direction, the inductance sensor 47 in this embodiment has a detection sensitivity of more than 10% of the detection sensitivity at the position of the sensor surface. The intention of describing the inductance sensor 47 as having the aforementioned detection sensitivity is to exclude the inductance sensor of the comparative example, which has a detection sensitivity of almost zero at a distance of greater than or equal to 1 [mm] from the sensor surface.

In the inductance sensor of the comparative example, the coil and the iron core protrude vertically from the surface of the circuit board. Therefore, the sensor surface of the inductance sensor in the comparative example is defined as the end surface of the tip of the protruding portion.

Figure 6:
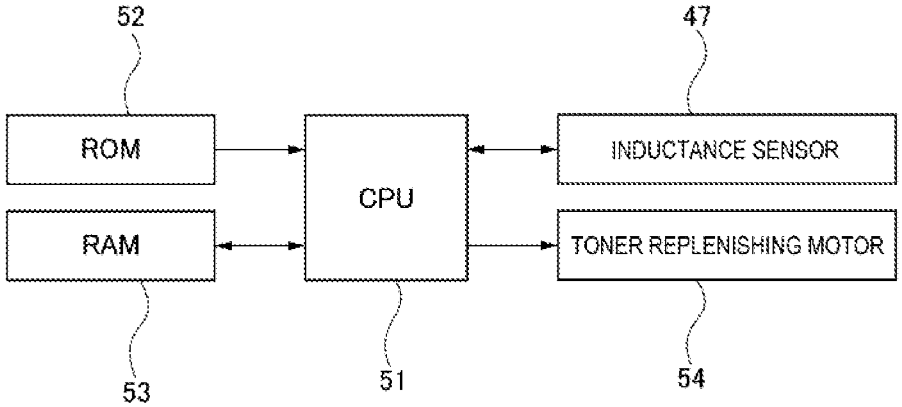
FIG. 6 is a block diagram showing a control portion of the image forming apparatus.

Next, the toner density control operation using the inductance sensor 47 will be described using FIGS. 6 and 7. FIG. 6 is a control block diagram of the image forming apparatus in this embodiment.

In this embodiment, the CPU 51 as the control means, which controls the image forming operation detects the toner density based on the output pulses of the inductance sensor 47 provided in the developing device 4. In this embodiment, the correspondence between the count number of the output pulses of inductance sensor 47 and toner density is recorded in the ROM 52. Based on the count number of the output pulses of inductance sensor 47, the CPU 51 detects the toner density from the aforementioned correspondence recorded in the ROM 52. The RAM 53 is the system working memory for the CPU 51 to operate. The toner replenishing motor 54 is a motor driven to replenish toner to the developing device and is a driving motor that drives a supply screw located in the developer replenishing device (not shown) described above.

Figure 7:
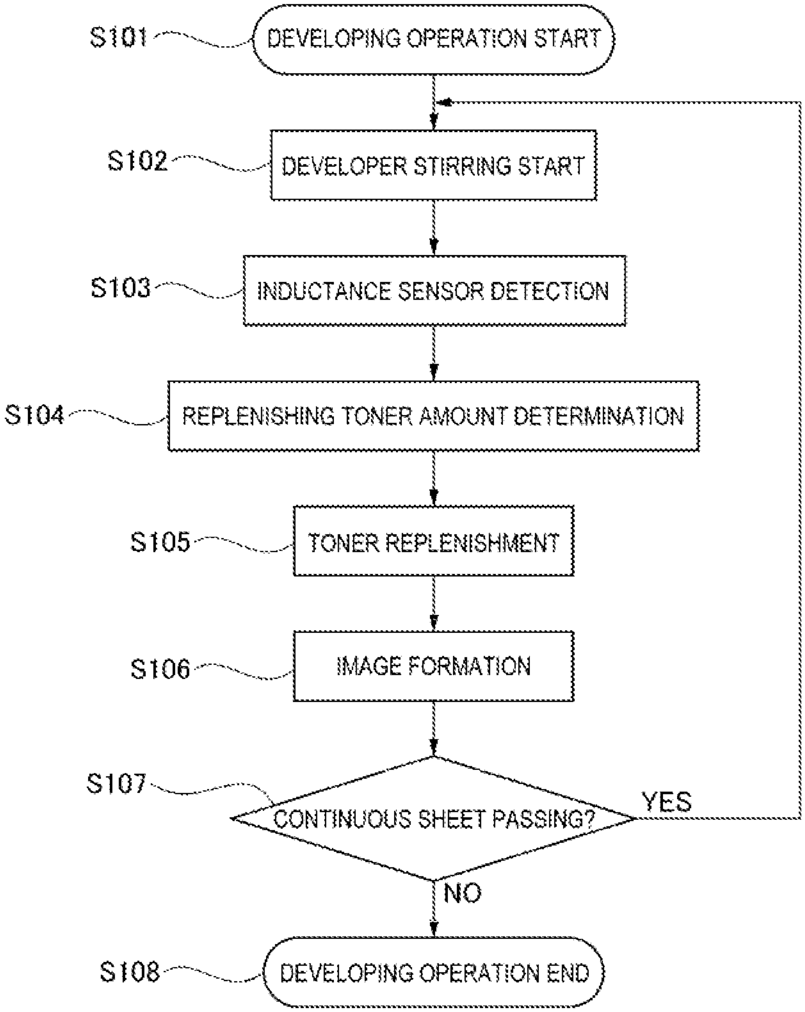
FIG. 7 is a flowchart showing the steps of controlling the toner density.

FIG. 7 is a flowchart of the toner density control operation, which is executed by the CPU 51 that reads a program recorded in the ROM 52. When the developing operation starts (step S101) and the stirring of the developer starts (step S102), the CPU 51 reads the output value of inductance sensor 47 and calculates the average of the output values for one period of the conveying screw (one rotation of the conveying screw). The CPU 51 uses the calculated output value (average value) to detect the toner density from the correspondence between the count number of the output pulses of the inductance sensor 47 and the toner density recorded in the ROM 52 (step S103) and to determine the amount of replenishment toner (step S104). When a signal instructing toner replenishment is output from the CPU 51, the toner replenishing motor 54 is driven and a predetermined amount of toner is replenished from the developer replenishing device (not shown) to the developing device 4 (step S105). The CPU 51 forms an image (step S106) and judges whether the continuous sheet passing mode is selected or not (step S107). When the continuous sheet passing mode is selected, the step S101 is retraced and when the continuous sheet passing mode is not selected, the control sequence terminates (step S108).

(Configuration of Conveying Screw Around Inductance Sensor)

Next, the configuration of the conveying screw around the inductance sensor will be described using FIGS. 8A and 8B, which show the configuration of the conveying screw around the inductance sensor.

The first conveying screw 45*a* and the second conveying screws 45*b*, respectively, have the rotary shaft 49 and the blade 48 spirally formed around the outer circumference of the rotary shaft 49. The first conveying screw 45*a* and the second conveying screw 45*b* both have an outer diameter R3 (16 [mm]) and a pitch P1 (20 [mm]) of the blade 48. The rotary shaft 49 has the rotary shaft portion 49*b* in the second conveying portion 45*b*2 (which will be described below) and the rotary shaft portion 49*a*. The shaft diameter R2 (see FIG. 8A) of the rotary shaft portion 49*a* is 6 [mm].

Figure 8A:
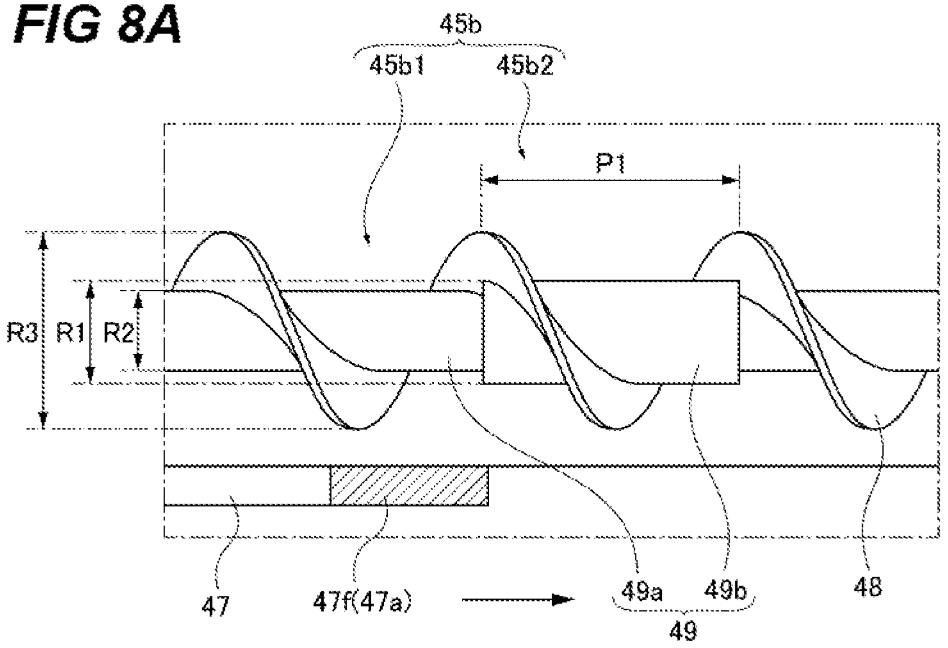
FIGS. 8A and 8B are diagrams showing the configuration of a second conveying screw around the inductance sensor.

As shown in FIG. 8A, the second conveying screw 45*b* has the first conveying portion 45*b*1 and the second conveying portion 45*b*2. The second conveying portion 45*b*2 is provided downstream of the first conveying portion 45*b*1 in the second direction (the direction of the arrow shown in FIG. 8A). The second conveying portion 45*b*2 is configured such that the amount of developer conveyed per unit time (hereinafter referred to as developer flow rate) is less than that of the first conveying portion 45*b*1.

In this embodiment, the second conveying screw 45*b* is configured such that in the rotary shaft 49, the shaft diameter R1 of the rotary shaft portion 49*b* in the second conveying portion 45*b*2 is larger than the shaft diameter R2 of the rotary shaft portion 49*a* portion in the first conveying portion 45*b*1.

The inductance sensor 47 is arranged such that the sensor surface 47*f* of the inductance sensor 47 is positioned immediately before the second conveying portion in the second direction and is opposed to the first conveying portion 45*b*1. The inductance sensor 47 has a detection sensitivity at a position 1 [mm] away from the sensor surface 47*f* in the direction toward the second conveying portion 45*b*2, which detection sensitivity is higher than 10% of the detection sensitivity at the position in contact with the sensor surface 47*f*. This detection sensitivity will be further described below.

FIG. 8A shows an enlarged, horizontal view of the configuration of the second conveying screw 45*b* around the inductance sensor 47 according to this embodiment. The shaft diameter R2 of the rotary shaft portion 49*a* of the second conveying screw is basically 6 [mm]. The second conveying screw 45*b* has a portion whose length is [mm] and whose diameter R1 is 11 [mm] downstream of the sensor surface 47*f* of the inductance sensor 47 in the conveying direction. The developer flow rate (developer conveying force) in the portion of the shaft diameter R2 is lower than that in the other portion. Therefore, immediately upstream of the position where the shaft diameter of the rotary shaft 49 changes, i.e., on the sensor surface 47*f* of the inductance sensor 47, a developer stagnates.

Figure 8B:
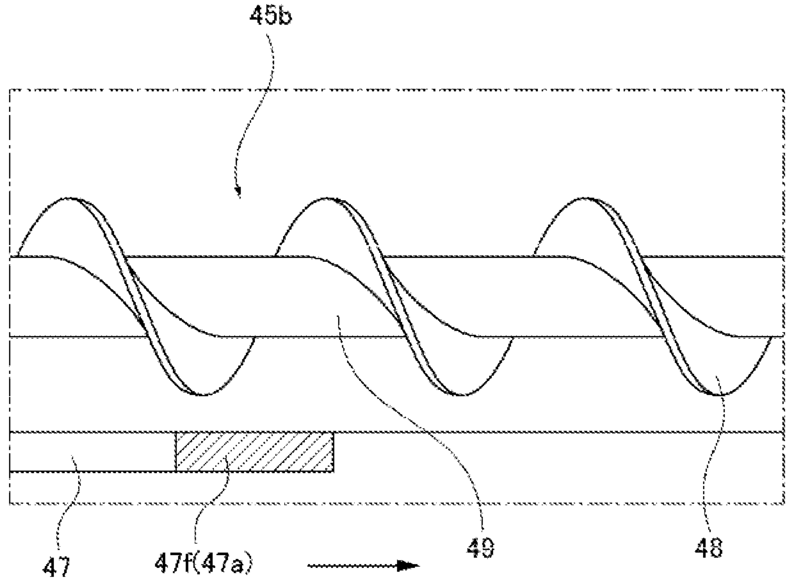

FIG. 8B shows an enlarged, horizontal view of the configuration of the second conveying screw 45*b* around the inductance sensor 47 according to a comparative example. The shaft diameter of the second conveying screw 45*b* is 6 [mm] for the entire length of the rotary shaft 49.

Figure 9:
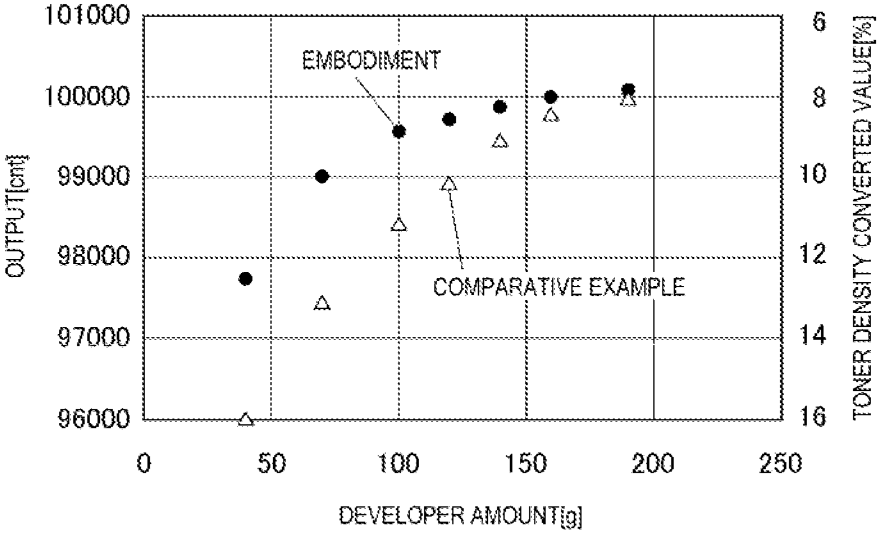
FIG. 9 is a graph showing changes in output results of the inductance sensor when the amount of developer changes.

Next, the detection sensitivity of inductance sensor 47 will be described using FIG. 9. FIG. 9 shows the results of measuring the output of inductance sensor 47 while varying the amount of developer in the developing container 44 in each embodiment of the present invention and the comparative configuration. The toner density of the developer is 8 [%], and the rotational speed of the second conveying screw 45*b* is 300 [rpm].

FIG. 9 shows the relationship between the amount of developer [g] in the developing container, the output of the inductance sensor [cnt], and the converted value of toner density [%] according to the output of the inductance sensor. The output of the inductance sensor corresponds to the detection sensitivity of the inductance sensor.

The results shown in FIG. 9 indicate that in both the embodiment and comparative example, the output of the inductance sensor changes differently based the amount of developer in the developing container 44, even though the same toner density of developer is measured. This is due to fluctuations in the density of the developer present in the detection area of the inductance sensor 47. As the density of the developer present in the detection area of the inductance sensor 47 decreases, the apparent magnetic permeability becomes smaller, resulting in a shorter resonance period and a decrease in the number of the output pulses of the inductance sensor. Conversely, as the density of the developer in the detection area of the inductance sensor 47 increases, the apparent magnetic permeability increases, resulting in a longer resonance period and an increase in the number of the output pulses of the inductance sensor.

Because of this property, even if the toner density does not change, the number of output pulses of the inductance sensor 47 also fluctuates as a result of a change in the density of the developer in the detection area of the inductance sensor 47 due to a change in the amount of developer in the developing container 44. This phenomenon causes the measured value to deviate from the correct toner density that should be detected.

The first vertical axis in FIG. 9 indicates the output value of the inductance sensor, and the second vertical axis indicates the toner density converted from the number of the output pulses when the amount of developer in the developing container fluctuates. In this case, the toner density of the developer in the developing container 44, which is the detection target, is 8 [%]. Therefore, a deviation from the toner density 8 [%] is a detection error due to fluctuations in the amount of developer (developer density in the detection area).

The amount of developer accommodated in the developing container 44 fluctuates with a change in the drive speed of the developing device during image formation, the temperature and humidity environment, the output image density, and so on. In the developing device 4 used in this embodiment and the comparative example, a variation range of the developer amount is assumed as 120 [g] to 200 [g]. In the configuration of the comparative example, a variation in the amount of developer in the expected use range causes a detection error of up to 2 [%] of the toner density. On the other hand, in the configuration of this embodiment, the range of the detection error is reduced to about 0.5 [%]. The output difference is particularly noticeable when the amount of developer in the developing container is small.

This indicates that the density of the developer in the detection area of inductance sensor 47 changes significantly when the amount of developer in the developing container 44 is small. Namely, in the comparative example, when the amount of developer in the developing container 44 is small, the density of the developer existing in the detection area of the inductance sensor 47 changes significantly, and the number of the output pulses of the inductance sensor 47 decreases accordingly. In contrast, in this embodiment, even when the amount of developer in the developing container 44 is small, a change in the density of the developer present in the detection area of the inductance sensor 47 is suppressed to a small extent, and a change in the number of the output pulses of the inductance sensor 47 is suppressed accordingly. In other words, according to this embodiment, even when the amount of developer in the developing container 44 is small, the density of the developer existing in the detection area of the inductance sensor 47 is stable, and this suppresses a decrease in the detection accuracy of the toner density of the inductance sensor 47.

The reason why this effect has been obtained will be explained using FIG. 10, which shows the distribution of the developer amount density in the stirring chamber 44*b* in the static state after 120 [g] of developer is fed and stirred for a sufficient time in each configuration of this embodiment and the comparative example. The developer amount density is calculated by dividing the developer in the stirring chamber 44*b* into areas each of which is 10 [mm] long in the longitudinal direction, taking out the developer in each area, measuring its weight, and calculating the developer amount density [g/mm] in each area.

Figure 10:
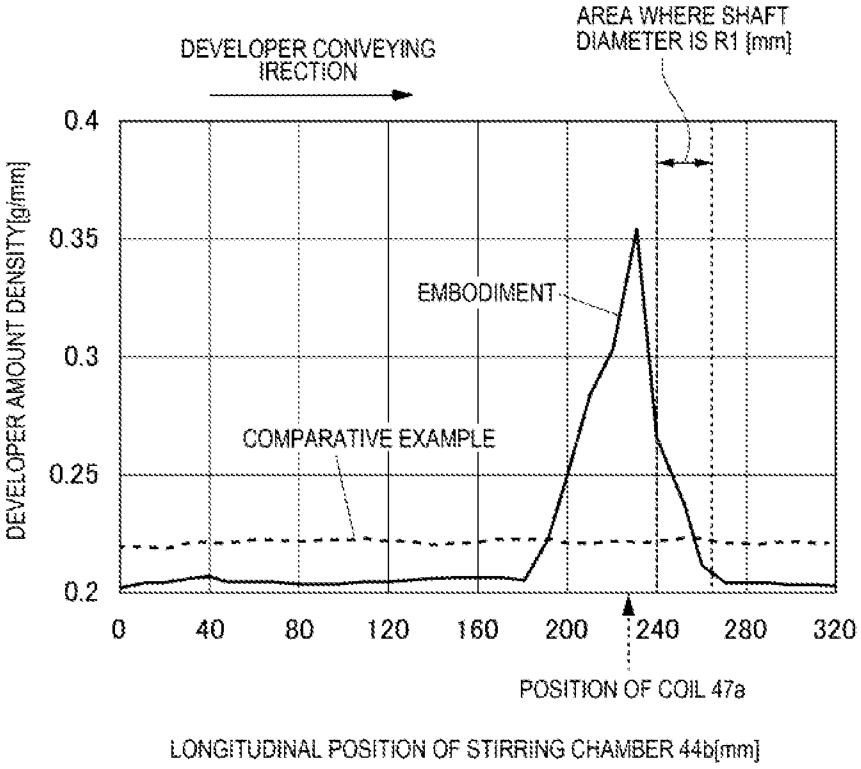
FIG. 10 is a diagram showing the developer amount density distribution in a stirring chamber for the configurations of an embodiment of the present invention and a comparative example.

As shown by the dashed line in FIG. 10, in the configuration of the comparative example, the distribution of the developer amount density in the longitudinal direction of the stirring chamber 44*b* is almost uniform. In contrast, as shown by the solid line in FIG. 10, in the configuration of this embodiment, the developer amount density increases around the position where the shaft diameter of the second conveying screw 45*b* changes from R2 (6 [mm]) to R1 (11 [mm]). This is because the flow rate of developer (conveying force of developer) is lower in the area where the shaft diameter of the second conveying screw 45*b* is larger (second conveying portion 45*b*2) than that in the other area (first conveying portion 45*b*1), and the developer is stagnant immediately upstream of the position where the shaft diameter is changed. In other words, the reason is that the developer stagnates at the position of the sensor surface 47*f* of the inductance sensor 47. This allows the detection area of the inductance sensor 47 to be filled with developer even when the amount of developer in the developing container 44 is small, thereby suppressing the toner density detection accuracy from decreasing. In other words, even when the amount of developer in the developing container is small, the density of the developer at the position of the sensor surface 47*f* of the inductance sensor 47 can be stabilized.

On the other hand, in the comparative example, when the amount of developer in the developing container 44 is small, the developer density in the detection area of the inductance sensor 47 decreases. Therefore, the detection area of the inductance sensor 47 cannot be filled with the developer, and the apparent magnetic permeability decreases. As a result, in the configuration of the comparative example, the number of the output pulses of the inductance sensor 47 decreases, resulting in a detection error in toner density and a decrease in toner density detection accuracy.

Therefore, as mentioned above, in this embodiment, the second conveying screw 45*b* is configured such that the second conveying portion 45*b*2 of the second conveying screw 45*b* is located downstream of the first conveying portion 45*b*1 in the second direction (the direction of the arrow shown in FIG. 8A) and that the second conveying portion 45*b*2 has a lower developer flow rate than that of the first conveying portion 45*b*1. In other words, the second conveying screw 45*b* is configured such that the second conveying portion 45*b*2, which is located downstream of the first conveying portion 45*b*1 in the second direction, reduces the conveying force of the developer from that of the first conveying portion 45*b*1.

The inductance sensor 47 is so arranged that the sensor surface 47*f* of the inductance sensor 47 is positioned immediately before the second conveying portion 45*b*2 in the second direction and is opposed to the first conveying section 45*b*1.

This allows the developer in this embodiment to stagnate in the detection area of the inductance sensor 47, which has the effect of stabilizing the result of the toner density detection even when the amount of developer is small.

(Developer Flow Rate)

The degree of weakening of the conveying force of the developer by the second conveying screw 45*b* will be described next using a physical quantity of the developer flow rate. The developer flow rate indicates the amount of developer conveyed per unit of time, and is expressed by the following relationship (Equation 1).

Developer flow rate [g/sec]=Developer conveying speed [mm/sec]×Developer amount density [g/mm] (Equation 1)

The developer is circulated such that the flow rate is conserved in the circulation path formed by the developing chamber 44*a* and the stirring chamber 44*b*. Therefore, the flow rate of the developer is constant even if it is measured in any of the areas divided by a predetermined distance in the longitudinal direction.

The conveying speed of the developer can be measured by the particle image velocimetry method after being photographed by a high-speed video camera from vertically above the developer surface with the cover portion of the top surface of the developing device 4 removed. For example, a high-speed video camera such as FASTCAM-SA-5.0 (manufactured by Photoron) can be used. Furthermore, by measuring the developer amount density in each area, the developer flow rate can be calculated using Equation 1.

Figure 11:
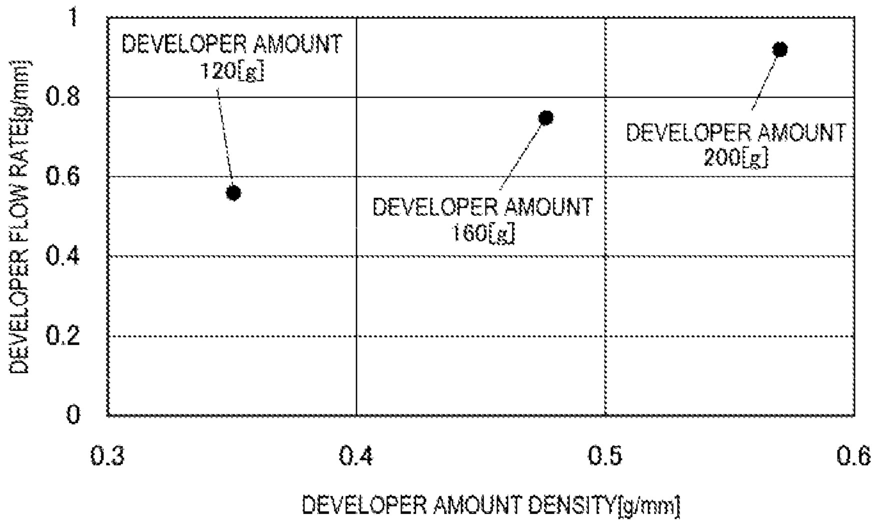
FIG. 11 is a graph showing changes in the flow rate of the developer.

FIG. 11 shows changes in the flow rate of the developer when the amount of developer in the developing container 44 is 120 [g], 160 [g], and 200 [g], using the developing device 4 in this embodiment. The vertical axis of FIG. 11 indicates the developer flow rate [g/sec]. The horizontal axis of FIG. 11 indicates the developer amount density [g/mm] in the area downstream of the inductance sensor 47 (the area where the shaft diameter of the second conveying screw 45*b* is R1). As shown in this figure, the flow rate of the developer varies linearly with the developer amount density in the area downstream of the inductance sensor 47.

Figure 12:
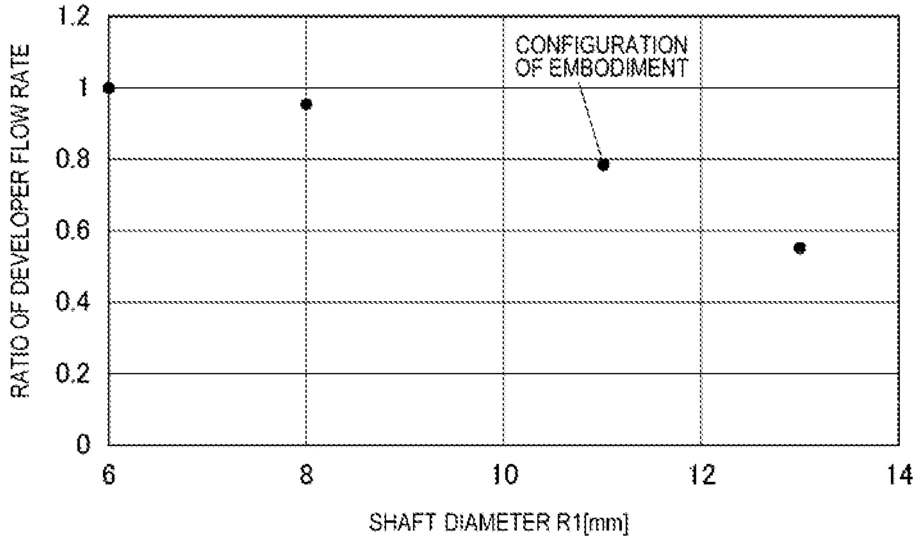
FIG. 12 is a graph showing changes in the flow rate of the developer in a case where the shaft diameter of a portion of the second conveying screw is changed.

FIG. 12 shows the flow rate ratio of the developer when the developer is fed into the developing container such that the developer amount density in the area downstream of the inductance sensor 47 is the same while varying the shaft diameter R1 of the second conveying screw 45*b* in the area downstream of the sensor surface 47*f* of the inductance sensor 47. FIG. 12 shows the cases where the measurement is performed while varying the shaft diameter R1 of the second conveying screw 45*b* to 6 [mm], 8 [mm], 11 [mm], and 13 [mm]. Furthermore, FIG. 12 shows the developer flow rate ratio in the case where the developer is fed into the developing container such that the developer amount density in the area downstream of the inductance sensor 47 is 0.4 [g/mm] at the respective shaft diameter R1. The developer amount density of 0.4 [g/mm] is just an example and is not limited to this value.

The horizontal axis of the FIG. 12 indicates the shaft diameter R1 of the second conveying screw 45*b* in the area downstream of the sensor surface 47*f* of the inductance sensor 47. The vertical axis of the FIG. 12 indicates the flow rate ratio when the flow rate of the developer is 1 when the shaft diameter of the second conveying screw 45*b* is uniform (6 [mm]) in the entire longitudinal direction.

As shown in FIG. 12, in order to keep the range of false detection due to developer amount fluctuations to 0.5 [%], it is necessary to use a screw configuration in which the conveying force is reduced such that the flow rate in the area downstream of the sensor surface 47*f* of the inductance sensor 47 becomes about 0.8 times that in the area upstream of the inductance sensor 47. To achieve this configuration by changing the shaft diameter of the second conveying screw 45*b*, the shaft diameter R1 in the area downstream of the inductance sensor 47 should be set such that the following relationship (Equation 2) are met using the shaft diameter R2 upstream of the inductance sensor 47 and the outer diameter R3 of the second conveying screw 45*b*.

$$R1>(R2+R3)/2 \quad \text{(Equation 2)}$$

Namely, the second conveying screw 45*b* is configured to satisfy the above relationship (Equation 2) when the shaft diameter of the rotary shaft portion 49*b* of the second conveying portion 45*b*2 is R1, the shaft diameter of the rotary shaft portion 49*a* of the first conveying portion 45*b*1 is R2, and the outer diameter of the second conveying screw 45*b* is R3.

When the starting point of the configuration for weakening the conveying force of the developer is located closer to the downstream end of the coil 47*a* constituting the sensor surface 47*f* of the inductance sensor 47 in the conveying direction, the sensor will be more effective. Therefore, it is desirable to place the starting point within a length of one pitch of the second conveying screw 45*b* (positioned upstream of inductance sensor 47) from the downstream end of the coil 47*a* in the conveying direction (downstream end in the arrow direction shown in FIG. 8A). In this embodiment, one pitch of the second conveying screw 45*b* corresponds to the length of 20 [mm] which extends from the downstream end of the coil 47*a* downstream in the conveying direction.

Furthermore, it is necessary for the configuration for weakening the conveying force of the developer to take up a range of length. However, when this range is longer than necessary, there arises a concern that the overall circulation is impeded so that a long time elapses for the replenishing toner to reach the developing sleeve 41 when the toner is consumed by the image formation. Therefore, it is desirable that the range of the configuration for weakening the developer conveying force should be about 0.5 to 2 times the length of one pitch of the second conveying screw 45*b* at the position upstream of the inductance sensor 47.

As mentioned above, the second conveying screw 45*b* of this embodiment is configured such that the flow rate of the developer in the second conveying portion provided downstream of the first conveying portion 45*b*1 in the second direction (direction of the arrow shown in FIG. 8A) is less than that in the first conveying portion 45*b*1. The sensor surface 47*f* of the inductance sensor 47 is positioned immediately before the second conveying portion 45*b*2 in the second direction and is opposed to the first conveying portion 45*b*1.

According to this embodiment, the developer stagnates in the detection area of the inductance sensor 47, thereby stabilizing the density of the developer in the detection area of the inductance sensor 47 and suppressing the detection accuracy of toner density from decreasing even when the amount of developer is small.

In this embodiment, the suppression of false detection of toner density by the inductance sensor 47 has been described, by exemplifying the case where the developer amount density in the detection area of the inductance sensor 47 fluctuates due to fluctuations in the developer amount in the developing container. However, the fluctuations in the drive speed of the developing device 4, i.e., the drive speed of the first conveying screw 45*a* or the second conveying screw 45*b*, may also cause the fluctuations in the developer amount density in the detection area of the inductance sensor 47. According to this embodiment, the developer amount density in the detection area of the inductance sensor 47 can be stabilized, which is effective even in an image forming apparatus with multiple drive speeds of the developing device 4 during image formation.

Other Embodiments

The rotary shaft 49 of the second conveying screw 45*b* in the aforementioned embodiment is configured as an example such that the shaft diameter R1 of the rotary shaft portion 49*b* in the second conveying portion 45*b*2 is larger than the shaft diameter R2 of the rotary shaft portion 49*a* in the first conveying portion 45*b*1. However, the invention is not limited to this configuration. It is sufficient for the second conveying screw 45*b* to be configured such that the flow rate of the developer in the second conveying section 45*b*2 provided downstream of the first conveying portion 45*b*1 in the second direction is less than that in the first conveying portion 45*b*1.

In other words, to achieve the effect of stabilizing the developer amount density in the detection area of the inductance sensor 47, it is sufficient for the second conveying screw 45*b* to be configured to reduce the developer flow rate in the area downstream of the inductance sensor 47 compared to that in the area facing the inductance sensor 47.

Figure 13A:
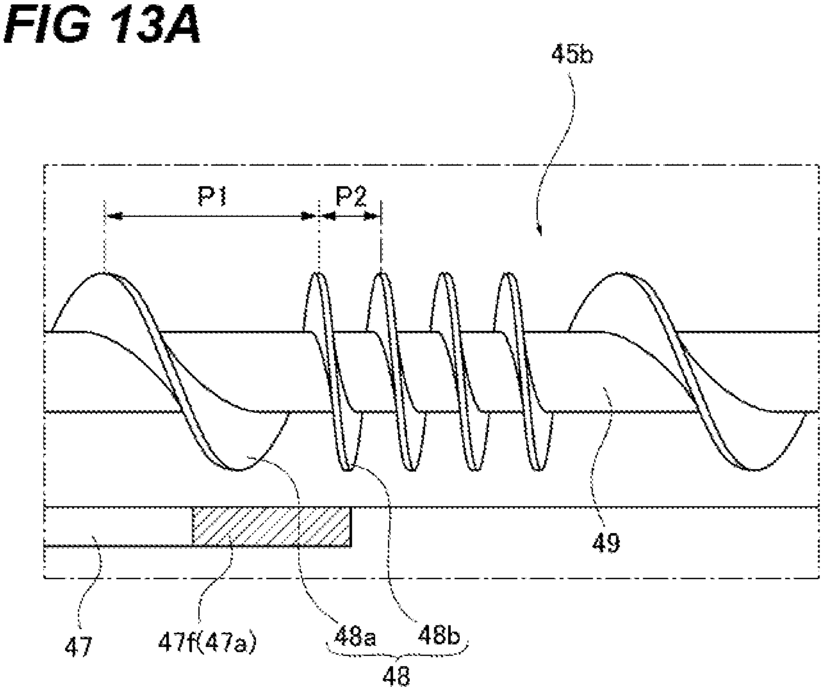
FIGS. 13A and 13B are drawings showing a second conveying screw as another embodiment of the present invention.

For example, as shown in FIG. 13A, the second conveying screw 45*b* can be configured such that the pitch of the blade of the portion of the second conveying screw 45*b*, which is downstream of the sensor surface 47*f* of the inductance sensor 47 is less than that in the portion of the second conveying screw 45*b*, which is opposed to the sensor surface 47*f*.

As shown in FIG. 13A, the second conveying screw 45*b* is configured such that the pitch P2 of the blade portion 48*b* of the blade 48 in the second conveying portion 45*b*2 is less than the pitch P1 of the blade portion 48*a* of the blade 48 in the first conveying portion 45*b*1.

In this case, in order to obtain the equivalent effect as in the aforementioned embodiment, the configuration should be adopted such that the flow rate of the developer in the area downstream of the inductance sensor 47 by the second conveying screw 45*b* is 80% or less of that in the area facing the inductance sensor 47. To achieve this configuration, the pitch P2 of the blade portion 48*b* of the second conveying screw in the area downstream of the inductance sensor 47 should be ½ or less than the pitch P1 of the blade portion 48*a* upstream of the blade portion 48*b*. For example, when the pitch P1 of the blade portion 48*a* in the area where the second conveying screw 45*b* faces the inductance sensor 47 is 20 [mm], the pitch P2 of the blade portion 48*b* in the area downstream of the blade portion 48*a* should be 10 [mm] or less.

This configuration has the equivalent effect as the aforementioned embodiment.

Figure 13B:
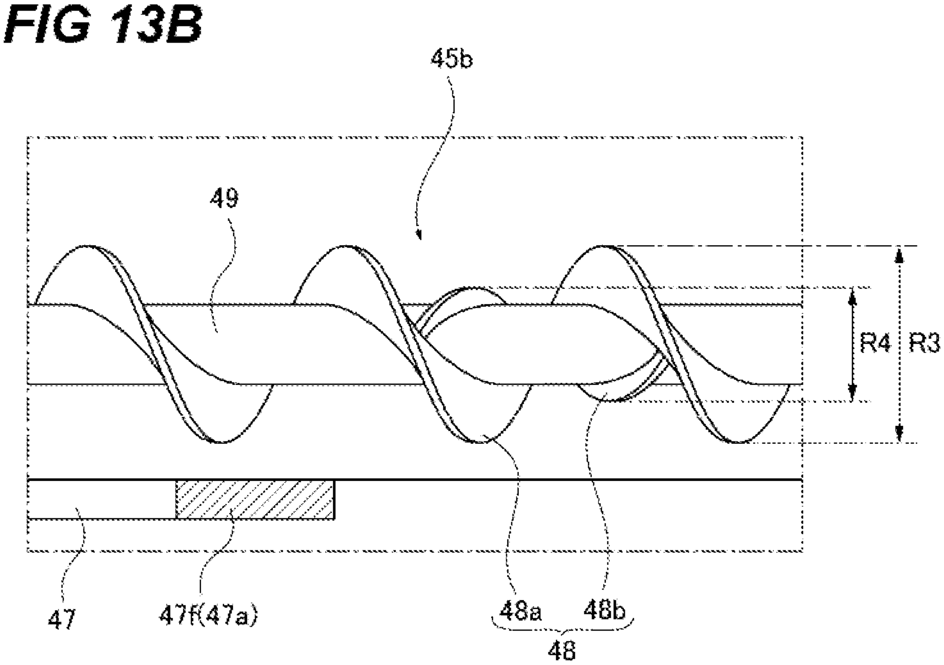

As shown in FIG. 13B, the second conveying screw 45*b* should be configured to have a reverse winding blade in the area downstream of the area facing the sensor surface 47*f* of the inductance sensor 47.

As shown in FIG. 13B, the blade 48 formed on the outer circumference of the rotary shaft 49 in the second conveying portion 45*b*2 of the second conveying screw includes the first blade portion 48*a* that conveys the developer in the second direction and the second blade portion 48*b* that conveys the developer in the first direction which is the opposite direction of the second direction.

In this case, to reduce the flow rate of the developer in the second conveying portion 45*b*2 to 80% or less compared to that in the first conveying portion 45*b*1, the second conveying screw 45*b* is configured as follows.

Namely, the second conveying section 45*b*2 should be so configured that the outer diameter R4 of the second blade portion 48*b* is less than the outer diameter R3 of the first blade portion 48*a* and is equal to or greater than ½ the outer diameter R3. Furthermore, the second blade portion 48*b* of the second conveying portion 45*b*2 is provided with a reversely winding blade with a 20 [mm] pitch. For example, the second conveying portion 45*b*2 should be configured such that the reversely winding second blade portion 48*b* with the outer diameter R4 of 8 [mm] or more and the pitch of 20 [mm] is added to the first blade portion 48*a* in the area downstream of the area facing the sensor surface 47*f* of the inductance sensor 47.

This configuration has the equivalent effect as the aforementioned embodiment.

Figure 14A:
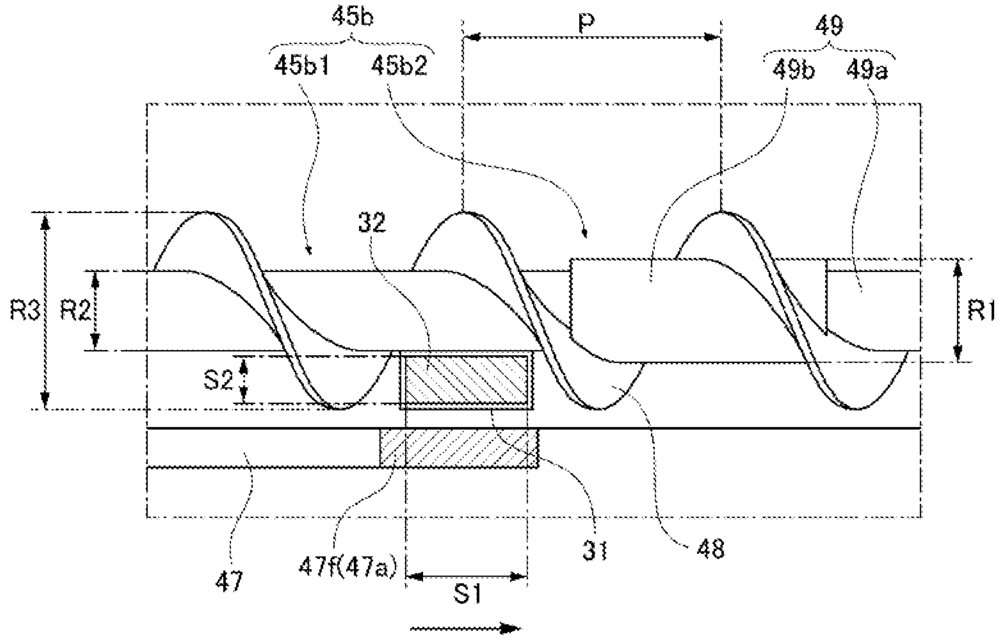
FIGS. 14A, 14B and 14C are drawings showing the configuration of a second conveying screw located in the vicinity of an inductance sensor as another embodiment of the present invention.
Figure 14B:
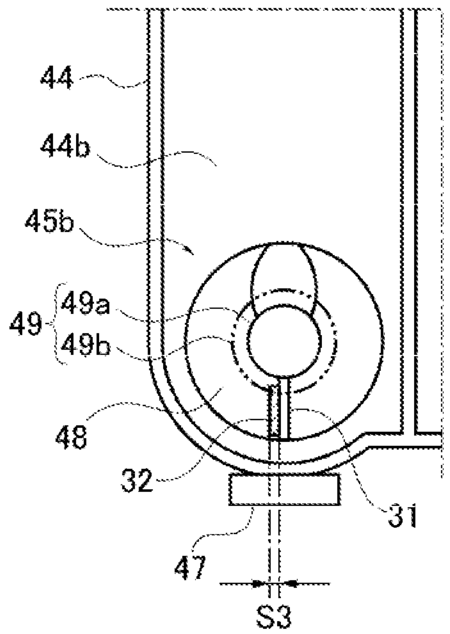
Figure 14C:
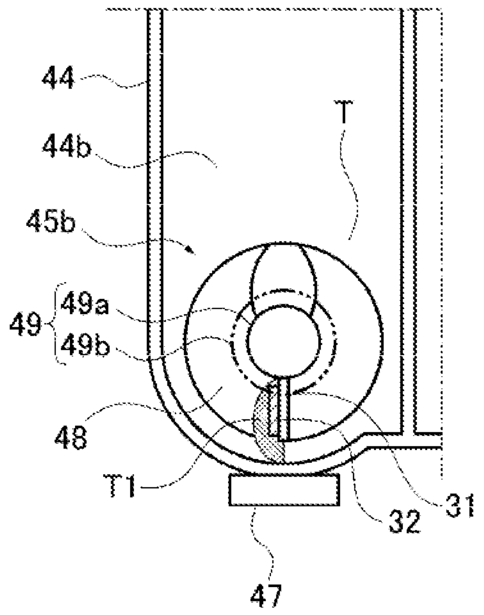
Figure 15:
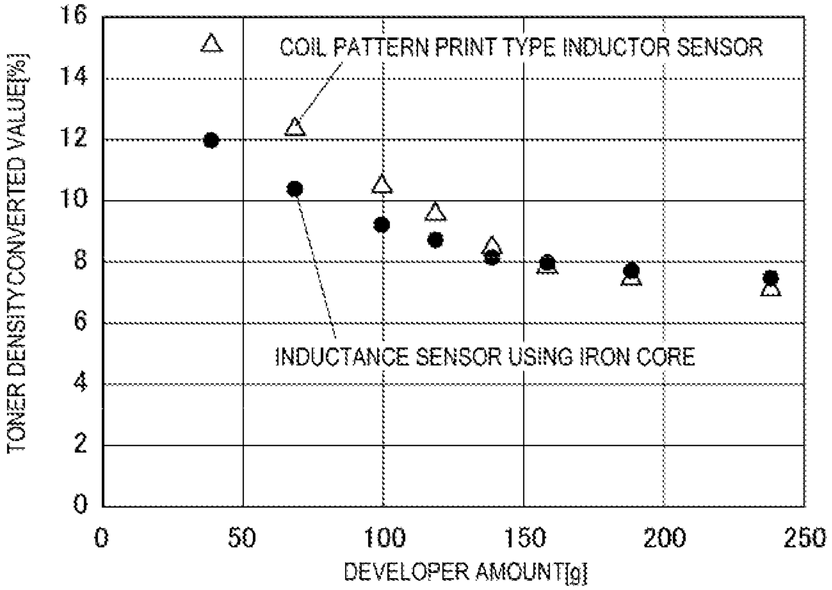
FIG. 15 is a graph showing the results of converting the output results of the inductance sensor to the equivalent of toner density when the developer amount changes.

Moreover, the following configuration can be added to the second conveying screw 45*b* facing the inductance sensor 47 of the aforementioned embodiment, which will be described using FIGS. 14A, 14B and 14C. FIG. 14A shows an enlarged, horizontal view of the configuration of the second conveying screw 45*b* around the inductance sensor 47 in this embodiment. FIGS. 14B and 14C respectively show an enlarged view of the configuration of the second conveying screw 45*b* around the inductance sensor 47 in this embodiment, viewed along a direction perpendicular to the cross-section of the developing container 44.

The second conveying screw 45*b* has, in addition to the configuration described above, the rib 31 that rotates synchronously with the rotation of the second conveying screw 45*b*. The rib 31 is provided at the position opposite the sensor surface 47*f* of the inductance sensor 47. The rib 31 is provided on the outer circumference of the rotary shaft 49 of the second conveying screw 45*b* separately from the aforementioned blade 48. The rib 31 is formed protruding outwardly from the outer circumference of the rotary shaft 49 and is straight along the axial direction of the rotary shaft 49.

The rib 31 is provided with the magnet sheet 32 as a magnet portion that bears the developer by magnetic force. The magnet sheet 32 adheres to one surface of the rib 31, which surface pushes the developer in the developing container in the direction of rotation when the second conveying screw 45*b* rotates. Therefore, the magnet sheet 32, together with the rib 31, is provided straight along the axial direction of the rotary shaft 49.

The magnet sheet 32 is magnetized by mixing chlorinated polyethylene as a binder (resin) with ferrite as a magnetic material. Since the developer T accommodated in the developing container 44 is two-component developer in which non-magnetic toner and magnetic carrier are mixed, the magnetic carrier is magnetically constrained by the magnet sheet 32, forming a high-density portion T1 of the developer T, as shown in FIG. 14C. The magnet sheet 32 is magnetized perpendicular to the surface to which it is attached to the rib 31.

The magnetic force of the magnet sheet 32 provided on the rib 31 causes the developer to be densely borne on the surface of the magnet sheet 32, and the conveying force of the second conveying screw 45*b* causes the developer borne on the surface of the magnet sheet 32 to be replaced. This allows the developer borne on the magnet sheet 32 to be replaced accordingly when the toner density in the developer in the developing container changes.

The magnet sheet 32 in this embodiment has the size of 8 [mm] in length s1 in the axial direction (longitudinal direction) of the second conveying screw 45*b*, 3 [mm] in length s2 in the vertical direction orthogonal to the axial direction, and 1 [mm] in thickness s3. The magnet sheet 32 is made of a magnetic material (ferrite) with a specific magnetic permeability of about 200 and has a magnetic force of 40 [mT]. The magnet sheet 32 is provided at the position which is 2.5 [mm] away from the sensor surface 47*f* of the inductance sensor 47. The size of this magnet sheet 32 and the distance from the sensor surface 47*f* of the inductance sensor 47 to the magnet sheet 32 are only examples and the present invention is not limited thereto.

The high-density portion T1 formed by the developer T borne by the magnet sheet 32 is maintained at a constant developer amount density by the magnetic force of the magnet sheet 32, regardless of a change in the developer amount in the developing container 44. When the rib 31 rotates in synchronization with the rotation of the second conveying screw 45*b*, the portion of developer T borne on the magnet sheet 32 (high-density portion T1) overlaps the area where inductance sensor 47 has a detection sensitivity of 10% or more. In other words, the high-density portion T1 formed by the developer T borne by the magnet sheet 32 occupies the area where the inductance sensor 47 can detect the toner density (the detection area of the sensor surface 47*f*).

This configuration further stabilizes the density of the developer in the detection area of the inductance sensor 47 and suppresses the detection accuracy of toner density from declining even when the amount of developer is small.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-093539, filed Jun. 9, 2022, which is hereby incorporated by reference herein in its entirety.

What is claimed is:

1. A developing device comprising:

a developer bearing member which bears developer including toner and carrier to develop an electrostatic latent image formed on an image bearing member;

a developing container which accommodates the developer;

a conveying screw which conveys the developer accommodated in the developing container; and an inductance sensor which includes a detecting portion which detects magnetic permeability of the developer accommodated in the developing container, wherein in a state the inductance sensor is not attached to the developing container and a predetermined magnetic material is disposed at a position in contact with the detection portion, an output value when the detecting portion detects magnetic permeability of the predetermined magnetic material is A, and in a state the inductance sensor is not attached to the developing container and the predetermined magnetic material is disposed 1 mm away from the detection portion in a vertical direction passing through the detection portion, an output value when the detecting portion detects magnetic permeability of the predetermined magnetic material is B, with $B/A \geq 0.1$ being satisfied, wherein the conveying screw includes:

a first conveying portion which has a first rotary shaft portion and a first blade portion which is spirally formed on an outer circumferential surface of the first rotary shaft portion and which conveys the developer in a conveying direction of the conveying screw; and a second conveying portion which has a second rotary shaft portion and a second blade portion which is spirally formed on an outer circumferential surface of the second rotary shaft portion and which conveys the developer in the conveying direction of the conveying screw, wherein the first conveying portion is disposed opposite the detection portion with respect to the conveying direction of the conveying screw, wherein the second conveying portion is disposed within one pitch downstream of the first blade portion from a downstream end of the detection portion with respect to the conveying direction of the conveying screw, and wherein a shaft diameter of the second rotary shaft portion is greater than a shaft diameter of the first rotary shaft portion.

2. The developing device according to claim 1, wherein assuming that the shaft diameter of the second rotary shaft portion is R1, the shaft diameter of the first rotary shaft portion is R2, and an outer diameter of the first blade is R3, the inequality $R1>(R2+R3)/2$ is met.

3. The developing device according to claim 1, wherein a length of the second conveying portion in the conveying direction of the conveying screw is 0.5 to 2 times a length of one pitch of the first blade portion.

4. The developing device according to claim 1, wherein the conveying screw further includes a rib formed as to protrude outwardly from an outer circumference of the first rotary shaft portion, and wherein the rib is disposed with respect to the conveying direction of the conveying screw and the rib is disposed opposite the detection portion.

5. The developing device according to claim 4, wherein the rib is provided with a magnet.

6. The developing device according to claim 1, wherein the inductance sensor further includes an output portion which outputs a pulse signal in accordance with the magnetic permeability detected by the detection portion.

7. The developing device according to claim 1, wherein the inductance sensor further includes a circuit board, and wherein the detection portion is an area on the circuit board, on which an area a pattern of a coil is formed.

* * * * *